United States Patent
Mues et al.

(10) Patent No.: US 6,280,097 B1
(45) Date of Patent: Aug. 28, 2001

(54) CORROSION RESISTANT CAM FOLLOWER BEARING ASSEMBLY

(75) Inventors: Kevin Dean Mues; Gary Theodore Sullwold, both of Valparaiso, IN (US)

(73) Assignee: Emerson Power Transmission Manufacturing, L.P., Maysville, KY (US)

(*) Notice: Subject to any disclaimer, the term of this patent is extended or adjusted under 35 U.S.C. 154(b) by 0 days.

(21) Appl. No.: 09/500,179

(22) Filed: Feb. 8, 2000

(51) Int. Cl.[7] .............................. F16C 19/24; F16C 33/78
(52) U.S. Cl. ......................... 384/569; 74/569; 384/449; 384/584
(58) Field of Search .................... 384/449, 564, 384/569, 587, 484, 489; 74/569; 123/90.42, 90.48, 90.5, 90.51

(56) References Cited

U.S. PATENT DOCUMENTS

| | | | |
|---|---|---|---|
| 3,596,533 | * | 8/1971 | Nightingale ................... 384/484 X |
| 4,869,604 | * | 9/1989 | Hill et al. ......................... 384/569 |
| 5,302,031 | * | 4/1994 | Yuasa ............................... 384/449 |
| 5,724,861 | * | 3/1998 | Mang ................................. 74/569 |
| 5,960,758 | * | 10/1999 | Giannone et al. ............. 123/90.42 |

* cited by examiner

*Primary Examiner*—Thomas R. Hannon
(74) *Attorney, Agent, or Firm*—McDonnell Boehnen Hulbert & Berghoff

(57) ABSTRACT

A corrosion resistant cam follower bearing assembly which includes a cam follower shaft, an outer bearing ring disposed about the shaft which defines an inner roller raceway, a sleeve fixedly mounted on the cam follower shaft and defining an inner roller raceway, a plurality of rollers interposed between said raceways, and seals at opposite axial ends of said outer bearing ring for protectively containing the roller elements and raceways. The outer bearing ring and sleeve are formed of heat treated corrosion resistant steel such that the raceways are hardened to at least 58 HRC, the outer bearing ring external exposed surfaces have a chrome plating for improved corrosion resistance in a working environment, and the cam follower shaft which also can be exposed to corrosive contaminants in a working environment is formed of a different and substantially more corrosion resistant material than the material of the sleeve and the outer bearing ring that defines the inner and outer bearing races.

18 Claims, 1 Drawing Sheet

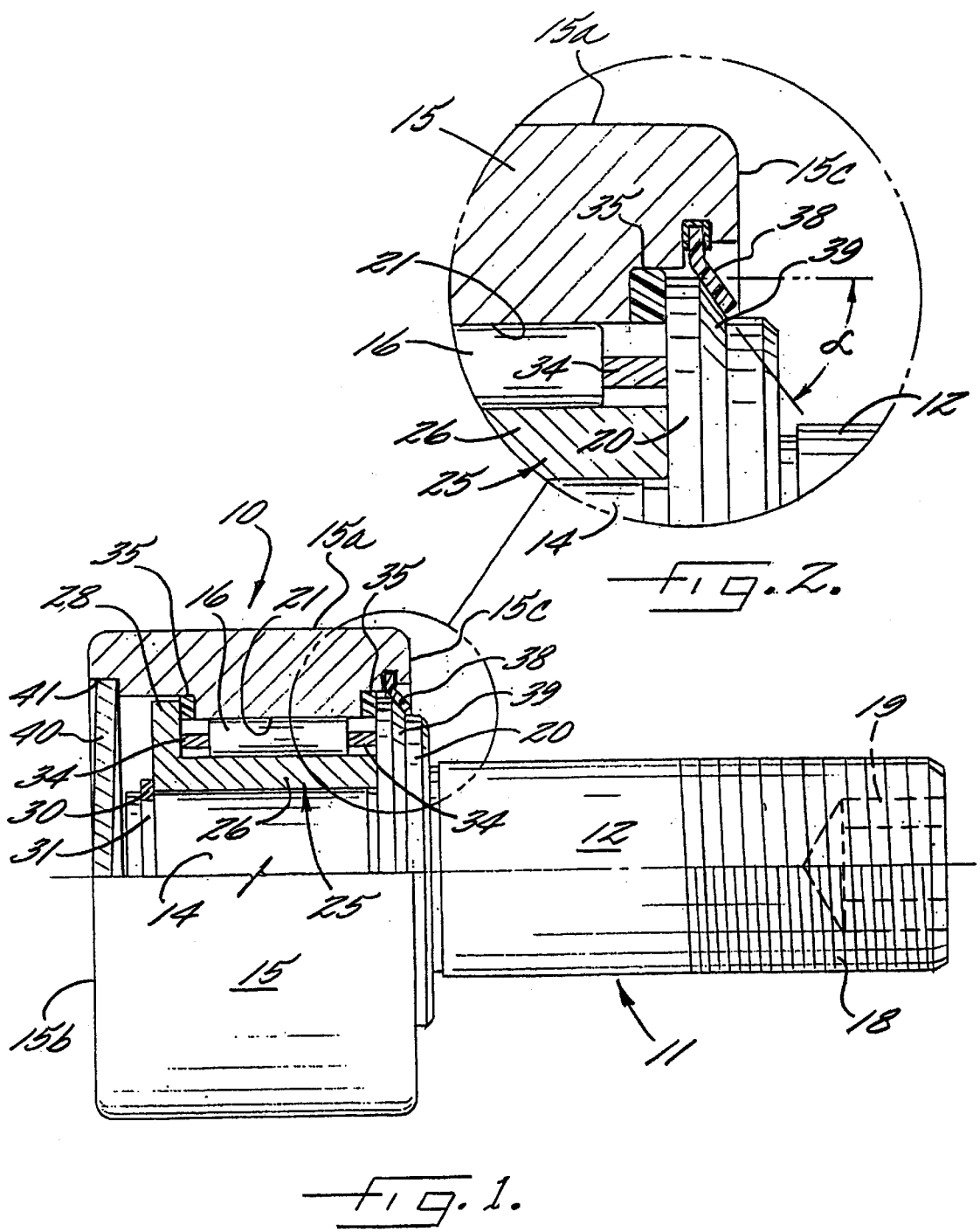

CORROSION RESISTANT CAM FOLLOWER BEARING ASSEMBLY

FIELD OF THE INVENTION

The present invention relates generally to cam follower bearing assemblies, and more particularly, to an improved corrosion resistant cam follower having hardened roller bearing raceways.

BACKGROUND OF THE INVENTION

Cam followers are used in many applications for translating rotational movement into linear movement, such as cam followers used in conveyor systems. During usage, inner and outer races of cam follower bearing assemblies can be subjected to relatively high bearing stresses. Hence, it is desirable to harden the roller raceways to improve bearing life. This commonly is accomplished by forming the inner and outer bearing races from high carbon, bearing grade steel and hardening the raceway areas, such as by heat treatment.

Such steel bearing races, however, are highly subject to corrosion, particularly when the cam followers are used in working environments in which they are subjected to liquids, corrosive chemicals, or other contaminants. Corrosion on external surfaces of the cam follower can be viewed by a user as adversely affecting the performance. Internal corrosion, of course, can lead to seizure and failure of the relatively moveable bearing components.

Efforts to overcome the corrosion problem by forming the cam follower components of a corrosion resistant metal alloy, such as austenitic stainless steel (type 300 series) typically are not practical since such corrosion resistant steel can not be hardened to the extent necessary for satisfactory bearing life. Alternately, forming the cam follower components of martensitic stainless steels, such as 440 C, provides a bearing grade steel which is hardenable. However, the corrosion resistant properties are less than that of the 300 series stainless steels. Proposals for protecting the bearing races of the cam follower from corrosive contaminants also have not been effective since the laterally extending stud or mounting shaft of the cam follower is an extension of the inner bearing race, and hence, can not be easily contained.

OBJECTS AND SUMMARY OF THE INVENTION

It is an object of the present invention to provide an improved, maintenance free and permanently-sealed, cam follower bearing assembly suitable for use in wet or corrosive environments.

Another object is to provide a cam follower bearing assembly as characterized above having hardened bearing races which can be used in contaminated working environments without harmful corrosion.

A further object is to provide a cam follower bearing assembly of the above kind which has an outwardly projecting mounting shaft formed of a highly corrosion resistant material.

Still another object is to provide a cam follower bearing assembly of the foregoing type that is relatively simple in design and economical to manufacture.

Other objects and advantages of the invention will become apparent upon reading the following detailed description and upon reference to the drawings, in which:

FIG. 1 is a side view, in partial section, of an illustrative corrosion resistant cam follower bearing assembly embodying the present invention; and FIG. 2 is an enlarged fragmentary section of the encircled area of the cam following bearing assembly shown in FIG. 1.

BRIEF DESCRIPTION OF THE DRAWING

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Referring now more particularly to the drawings, there is shown an illustrative cam follower bearing assembly 10 embodying the present invention. The cam follower bearing assembly 10 includes a shaft or stud 11 having a mounting end 12 and a bearing end 14, a relatively rotatable outer bearing ring 15 about the bearing end 14 of the shaft 11, and a plurality of rolling elements, in this case in the form of rollers 16, for permitting relative rotational movement between the outer bearing ring 15 and the shaft 11. To facilitate mounting of the cam follower bearing assembly 10, such as to a conveyor frame, the mounting end 12 of the shaft 11 in this case has an externally threaded section 18 and the axial end of the shaft if formed with a hex-configured socket 19 for receiving a hex wrench. The illustrated cam follower shaft 11 further has an integrally formed, radial locating flange 20 intermediate the bearing and mounting ends 12, 14.

The outer bearing ring 15 defines an inner-annular, bearing raceway 21 and preferably is formed of a hardened martensitic stainless steel, such as heat treated 440 C steel, suitable for withstanding high bearing stresses created by the relatively movable roller elements 16, as well as high contact stresses the bearing ring 15 may incur externally from conveyor tracks, cams, or the like. The outer bearing ring 15 preferably is heat treated to a minimum hardness of 58 HRC. The external surfaces of the outer bearing ring 15 directly exposed to the working environment, namely an outer annular surface 15a and the axial end surfaces 15b, 15c, preferably are chrome plated for improved corrosion resistance.

In accordance with the invention, the cam follower shaft, which also is exposed to the working environment, is formed of a metal material substantially more resistant to corrosion than the material of the outer bearing ring which defines the outer bearing raceway. It will be understood by one skilled in the art that the mounting end of the cam follower shaft is particularly susceptible to exposure to wash baths, corrosive chemicals, and other contaminants in working environments involving such contaminants. Contrary to the prior art, the subject cam follower shaft 11 is formed of a material substantially more corrosion resistant than the material of the outer ring 15. The cam follower shaft 11 preferably is formed of a precipitation-hardening stainless steel, such as 17-4 PH, which can be hardened by heat treatment so as to provide some enhanced strength, though not to the hardness necessary for a bearing raceway. Alternatively, an austenitic stainless steel, such as type 300 series stainless steel, can be used, which can not be heat treat hardened. In either instance, the cam follower shaft would have significantly greater resistance to corrosion than the heat treated steel that forms the outer bearing ring 15 and defines the outer roller raceway 21.

In keeping with the invention, for defining an inner bearing raceway with a hardened surface, a separate sleeve made of heat treated, hardened steel is fixedly mounted and protectively contained on the cam follower shaft. To this end, in the illustrated embodiment, a separate sleeve 25 is fixedly mounted on the bearing end 14 of the cam follower shaft 11, such as by press fitting. The sleeve 25 in this case has a T-shape defined by a cylindrical raceway defining portion 26 and a radial flange 28. The sleeve 25 is mounted on the bearing end 14 of the cam follower shaft 11 with one axial end in abutting relation to the radial locating flange 20 of the cam follower shaft 11 and with the radial sleeve flange 28 located at the opposite axial end. The sleeve 25 is made of a hardened steel such that the outer surface of the cylindrical portion 26 defines an inner hardened roller bearing raceway between the radial flanges 20, 28. The sleeve 25 preferably is made of 440 C stainless steel heat treated to minimum 58 HRC, similar to the bearing ring 15 which defines the outer raceway 21.

For further maintaining the inner raceway defining sleeve 25 in mounted abutting relation to the cam follower shaft flange 20, a retaining ring 30 is fixed adjacent the outer axial end of the sleeve 25 in an annular groove 31 of the cam follower shaft 11. For evenly spacing the rollers 16 about the inner sleeve 26 and outer raceway 21, a separating cage 34 is used in the preferred embodiment. The separating cage 34 allows an increased internal void as a lubricant reservoir, as well as the capability for higher operating speeds. As an alternate, a full complement of rolling elements can be used for increased load carrying capability.

In order to reduce friction between the relatively rotatable outer bearing ring 15 and cam follower shaft and sleeve 11, 25, thrust washers 35, preferably made of nylon, are interposed between axial faces of the radial flanges 20, 28 and the outer bearing ring 15. The outer bearing ring 15 in this instance is formed with annular channels or counterbores adjacent opposite axial ends of the outer bearing raceway 21, which define axial bearing surfaces for the thrust washers 35.

In carrying out the invention, means are provided for protectively containing and sealing the inner and outer bearing raceways defined by the sleeve 25 and outer bearing ring 15 from the outside environment. In the illustrated embodiment, for preventing entrance of contaminants between the cam follower shaft 11 and the outer bearing ring 15 adjacent one axial end of the outer bearing ring 15, an annular lip seal 38 made of synthetic material, such as nylon, is fixed within an annular groove of the outer bearing ring 15 with the inside diameter thereof in wiping and sliding contact with an outer face 39 of the cam follower shaft retaining flange 20. To facilitate such sliding and sealing contact, the outer sealing face 39 of the cam follower shaft flange 20 is tapered at an angle α of about 60 degrees to the rotary axis of the cam follower.

To prevent the ingress of contaminants into the bearing assembly from the opposite axial end of the outer bearing ring 15, an expansion plug 40 is seated into an outwardly facing counter bore 41 formed in the outer bearing ring 15. The expansion plug 40, which may be of a conventional type made of a corrosion resistant stainless steel, has a convex shaped disk which can be assembled into the counter bore 41 by applying pressure centrally against the convex face. Release of the expansion plug 40 causes the disk to expand into secure and sealing contact with the counter bore 41 with an interference fit.

It will be appreciated by one skilled in the art that the cam follower effectively defines a permanently sealed bearing assembly within which a lubricant or grease may be contained. Since the heat treated hardened raceways defined by the sleeve 25 and outer bearing ring 15 are protectively sealed from the outside environment, they are not subject to contact by liquids or corrosive contaminants. The cam follower shaft 11, which is exposed to such contaminants, is formed with a highly corrosion resistant material. Similarly, chrome plating of the exterior surfaces of the outer bearing ring protects the exposed surfaces of that element from corrosion.

Hence, it can be seen from the foregoing that the cam follower bearing assembly of the present invention has hardened bearing races for reliable operation, but yet can be used in contaminated work environments without corrosive effects which can be detrimental to reliable operation or appearance. The cam follower assembly further defines a permanently sealed bearing assembly which is adapted for long time reliable operation. Nevertheless, it has a relatively simple construction which lends itself to economical manufacture.

What is claimed is:

1. A cam follower bearing assembly comprising a cam follower shaft having a mounting end and a bearing end, an outer cam follower bearing ring disposed concentrically about the bearing end of said shaft for relative rotation, a sleeve separate and apart from said cam follower shaft fixedly mounted on said bearing end of said cam follower shaft, said outer ring and sleeve defining respective outer and inner annular raceways, a plurality of rollers interposed between said raceways for facilitating relative rotational movement between said outer ring and said cam follower shaft and sleeve, said outer ring and sleeve being formed of a heat treated hardened steel, and said cam follower shaft being formed of a material which is different from the material of said sleeve and substantially more resistant to corrosion.

2. The cam follower bearing assembly of claim 1 in which said sleeve and outer bearing ring are formed of steel hardened to at least 58 HRC.

3. The cam follower bearing assembly of claim 2 in which said cam follower shaft is formed of a material having a hardness less than 58 HRC.

4. The cam follower bearing assembly of claim 1 including seals disposed at opposite axial ends of said outer bearing ring for protectively containing said raceways and rolling elements from the outside environment.

5. The cam follower bearing assembly of claim 4 in which one of said seals is an annular lip seal fixed to said outer bearing ring for sliding sealing contact with said cam follower shaft.

6. The cam follower bearing assembly of claim 5 in which said cam follower shaft has an integrally formed radial flange between said bearing and mounting ends, and said lip seal is in sliding sealing contact with said radial flange.

7. The cam follower bearing assembly of claim 6 in which said radial flange has a sealing face tapered at an angle of about 60 degrees to the axis of said cam follower shaft, and said lip seal sealingly contacts said tapered face.

8. The cam follower bearing assembly of claim 4 in which another of said seals is a convex-shaped expansion disk engageable with and sealingly enclosing an axial end of said outer bearing ring.

9. The cam follower bearing assembly of claim 1 in which said cam follower shaft has an outwardly extending radial flange located between said bearing and mounting ends, said sleeve being T-shaped defined by a cylindrical raceway defining portion and a radial flange, said sleeve being mounted on the bearing end of said cam follower shaft with one axial end in abutting relation to the radial flange of said cam follower shaft and with the radial flange of said sleeve at the opposite axial end so that said cylindrical portion defines an inner hardened roller bearing raceway between said radial flanges.

10. The cam follower bearing assembly of claim 9 including a retainer ring secured to said cam follower shaft for maintaining said sleeve in abutting relation to the radial flange of said cam follower shaft.

11. The cam follower bearing assembly of claim 9 including a pair of thrust washers each being interposed between axial faces of said radial flanges and said outer bearing ring.

12. The cam follower bearing assembly of claim 11 in which said outer bearing ring is formed with annular channels at opposite axial ends which define axial bearing surfaces for said thrust washers.

13. The cam follower bearing assembly of claim 1 in which said plurality of rolling elements are evenly spaced by use of a separating cage.

14. A cam follower bearing assembly comprising a cam follower shaft having a mounting end and a bearing end, an outer cam follower bearing ring disposed concentrically about the bearing end of said shaft for relative rotation, a sleeve separate and apart from said cam follower shaft fixedly mounted on said bearing end of said cam follower shaft, said outer ring and sleeve defining respective outer and inner annular raceways, a plurality of rolling elements interposed between said raceways for facilitating relative rotational movement between said outer ring and said cam follower shaft and sleeve, said outer ring and sleeve being formed of a heat treated steel such that said raceways have a hardness of at least 58 HRC, and said cam follower shaft being formed of a material which is different from the material of said sleeve and outer ring and which has a hardness less than 58 HRC.

15. The cam follower bearing assembly of claim 14 including seals disposed at opposite axial ends of said outer bearing ring for protectively containing said raceways and rolling elements from the outside environment.

16. The cam follower bearing assembly of claim 15 in which one of said seals is an annular lip seal fixed to said outer bearing ring for sliding sealing contact with said cam follower shaft, the other of said seals is a convex-shaped expansion disk engageable with and sealingly enclosing an axial end of said outer bearing ring.

17. The cam follower bearing assembly of claim 14 in which said cam follower shaft has an outwardly extending radial flange located between said bearing and mounting ends, said sleeve being T-shaped defined by a cylindrical raceway defining portion and a radial flange, said sleeve being mounted on the bearing end of said cam follower shaft with one axial end in abutting relation to the radial flange of said cam follower shaft and with the radial flange of said sleeve at the opposite axial end such that said cylindrical portion defines an inner hardened roller bearing raceway between said radial flanges.

18. The cam follower bearing assembly of claim 14 in which said plurality of rolling elements are evenly spaced by use of a separating cage.

* * * * *